United States Patent
Roby

(10) Patent No.: US 8,770,260 B2
(45) Date of Patent: Jul. 8, 2014

(54) METHOD FOR RAPID GENERATION OF MULTIPLE INVESTMENT CAST PARTS SUCH AS TURBINE OR COMPRESSOR WHEELS

(75) Inventor: Stephen I. Roby, Asheville, NC (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 12/490,685

(22) Filed: Jun. 24, 2009

(65) Prior Publication Data

US 2010/0006252 A1  Jan. 14, 2010

Related U.S. Application Data

(60) Provisional application No. 61/079,366, filed on Jul. 9, 2008.

(51) Int. Cl.
*B22D 29/00* (2006.01)
*B22C 11/00* (2006.01)
*B22C 19/04* (2006.01)

(52) U.S. Cl.
USPC ............. 164/35; 164/4.1; 164/6; 164/15; 164/23; 164/516; 164/517; 164/518; 164/519

(58) Field of Classification Search
USPC ............. 164/35, 4.1, 6, 15, 23, 516–519
See application file for complete search history.

(56) References Cited

U.S. PATENT DOCUMENTS

| | | | | |
|---|---|---|---|---|
| 3,405,220 A | * | 10/1968 | Barrow et al. | 373/150 |
| 5,868,194 A | * | 2/1999 | Horwood | 164/456 |
| 6,344,160 B1 | * | 2/2002 | Holtzberg | 264/102 |
| 6,568,458 B2 | * | 5/2003 | Naik et al. | 164/361 |
| 2001/0032713 A1 | * | 10/2001 | Penn et al. | 164/34 |
| 2007/0039709 A1 | * | 2/2007 | Endo et al. | 164/76.1 |
| 2007/0077323 A1 | * | 4/2007 | Stonesmith et al. | 425/174.4 |

* cited by examiner

*Primary Examiner* — Erin Saad
(74) *Attorney, Agent, or Firm* — Miller Canfield

(57) ABSTRACT

The process for investment casting of complex shapes has historically had 6 basic steps in it. Depending upon the path taken, these discrete steps have been reduced to either 5 steps, or to 2 steps, discarding the unwanted steps. Instead of having to generate the shape of each sacrificial pattern, the process generates either (A) a male tree containing a plurality of sacrificial patterns, already on their runners, onto which a mold shell can be formed, or, (B) a female shell, made of a refractory material, and forming internally the outside surfaces of the plurality of patterns and runners.

This process removes both capital expenditure for tooling and process time by up to 90%. By removing several lengthy, time-dependant steps from the process the part cost and lead time are reduced.

14 Claims, 9 Drawing Sheets

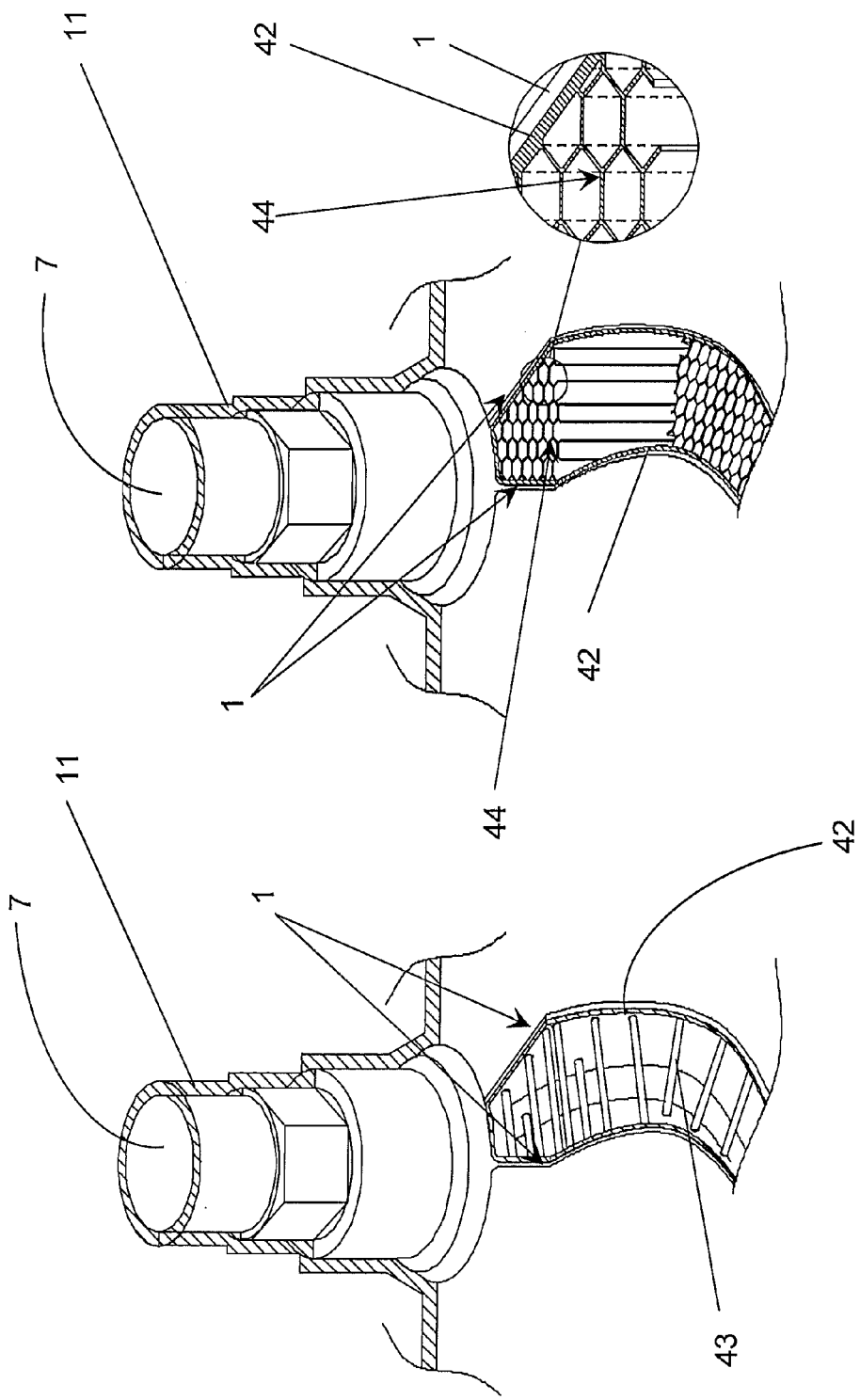

METHOD FOR RAPID GENERATION OF MULTIPLE INVESTMENT CAST PARTS SUCH AS TURBINE OR COMPRESSOR WHEELS

FIELD OF THE INVENTION

This invention is directed at improvements in the ancient art of investment casting, and particularly as it applies to manufacture of complex shapes such as turbocharger wheels, even titanium turbocharger wheels, as well as for parts which might be cast using the investment casting process but for geometry limitations in the part.

DESCRIPTION OF THE RELATED ART

Turbochargers are used on internal combustion engines to harness exhaust energy from the combustion system. Exhaust gas is used to drive a turbine which is mechanically connected to a compressor. The compressor is used to increase the density and pressure of the air entering the combustion chamber, which, when combined with the correspondingly increased amount of fuel, produces more power than would be generated using normal atmospheric air induction pressure. The design and function of turbochargers are described in detail in the prior art, for example, U.S. Pat. Nos. 4,705,463, 5,399,064, and 6,164,931, the disclosures of which are incorporated herein by reference.

On diesel engines, since the turbine stage is operating at up to 815° C. and the compressor stage is operating at up to 233° C., the materials need to be appropriate for each stage. Recently, tighter regulation of engine exhaust emissions has led to an interest in even higher pressure ratio boosting devices. While aluminum had been a material of choice for compressor wheels due to low weight and low cost, the temperature at the blade tips, the stresses due to increased centrifugal forces at high RPM, and the accumulated damage due to the duty cycle exceed the capability of conventionally employed aluminum alloys. As the industry shifts from aluminum to higher strength materials, there is at the same time a search for ever more economical manufacturing techniques.

Turbine wheels have a relatively simple shape as befits their function of being driven by exhaust gas flow, as well as historic limitations in both the structural aspect and the manufacturing process, and are today most commonly manufactured from an Inconel® super-alloy material using an investment casting process.

Compressor wheels on the other hand have evolved into a highly refined and complex shape to increase the pressure efficiently to deliver a high pressure ratio. The complex shape makes it difficult to form the sacrificial positive pattern necessary for investment casting.

One possible way to form the necessary complex compressor wheel positive pattern is to individually cast wax blades, cast a wax hub, and manually adhere the blades to the hub. However, such a technique is labor intensive and not precise. Accordingly, alternative manufacturing techniques such as the "rubber pattern" technique have been used to manufacture molds for casting compressor wheels. A flexible and resilient positive pattern is produced, and the pattern is used to create a plaster female or negative mold. The flexible pattern is removed and molten aluminum is vacuumed into the female plaster mold or "tub". The aluminum is allowed to solidify. Upon solidification of the aluminum, the plaster mold is broken away to reveal an aluminum facsimile of the master wheel pattern.

For higher molten temperature materials, a flexible and resilient hollow positive pattern is made, and the pattern is dipped into a ceramic molding media capable of drying and hardening. The dipped pattern is removed from the media to form a ceramic layer on the flexible pattern, and the layer is coated with sand and air-dried to form a ceramic layer. The dipping, sanding and drying operations are repeated several times to form a multi-layer ceramic shell. The flexible wall pattern is then removed from the shell by partially collapsing with suction, if necessary, to form a first ceramic shell mold with a negative cavity defining the part. A second ceramic shell mold is formed on the first shell mold to define the back of the part and a pour passage, and the combined shell molds are fired in a kiln. A high temperature casting material is poured into the shell molds, and after the casting material solidifies, the shell molds are removed by breaking.

Recently, a breakthrough has been made in the manufacture of titanium compressor wheels. As taught in U.S. Pat. No. 6,663,347 (Decker, Roby), the breakthrough was made not by adapting the investment casting technique to the complex compressor wheel shapes, but—contrary to accepted wisdom—by simplifying compressor wheel shapes so that they can once again be manufactured by investment casting techniques.

Accordingly, investment casting has taken on a new significance in the turbocharger industry.

While this breakthrough has resulted in a significant reduction in the cost of manufacturing titanium compressor wheels, the industry is always looking for the next cost-cutting manufacturing technique. Accordingly, the present inventors undertook a re-examination of the investment casting process.

The basic steps in the investment casting process include:
Forming a wax or consumable plastic pattern using a solid, usually metal, tooling die, the tooling die usually produced by machining or casting metal.
This die consists of multiple inserts, which run in precisely machined tracks or grooves such that when fully inserted, the die sets form the outside, as a female, surface of the pattern. In general, the assembly of inserts, dies, base, and mechanism are known as "the tool". The combination of the inserts for each segment (for each air space in the part) are generally known as "die-sets".
The development of the metal die insert requires very exact machining so that it properly replicates, in the injected wax, the desired shape.
The tool must be particularly accurately manufactured in zones where the inserts locate against the adjacent partner insert, or the base. Failure to do so will result in a positive "burr" or "flash" of the solidified injected material if the non-fit is negative, or a negative groove in the solidified material if the non-fit is a positive.
The die sets are then mechanically retracted from the solidified wax to allow removal of the sacrificial pattern from the tool.
This retraction mechanism usually takes the form of a scroll machined into the base. The scroll drives pins, or levers, attached to each segment such that rotation of the scroll causes the individual inserts, moving in an iris mechanism, to either retract, or mesh, depending upon the direction of rotation. In typical turbocharger turbine wheel tools, the mechanism is a simple scroll driving the inserts to move in a radial direction, in or out. This is usually hand driven but can be power driven.
Wear in the tool for the generation of the wax patterns must be carefully monitored. This is to ensure that wear, between adjacent inserts, adjacent segments of a compound insert, or wear between the insert and the base does not result in a non-fit aberration, which will manifest itself as an artifact on the consumable pattern, and thus the cast part.

For very high production, these dies sets take the form of a simple injection molding device which produces plastic consumable patterns. The basic process function is the same: produce a facsimile of the part which is then used to produce a female refractory shell.

Repeatedly coating the sacrificial pattern with ceramic based refractory slurries, and drying each time, under controlled conditions, until a thick shell has been deposited on the outer features of the facsimile.

This is an extremely time consuming operation. Because the drying of said slurry must be controlled, to prevent unwanted shrinkage or cracking of the shell, this operation must take place in humidity and temperature controlled environment, which makes it both a time and capital intensive operation. There are many patents dealing with improvements to this part of the operation, as it takes the majority of the cycle time for any part. This operation often takes four to five days to execute.

Shrinkage of the drying slurry is a complex subject, and a complicated process, which must be constantly monitored. The process parameters are subject to the thickness of sections in the consumable pattern, the thickness of each coat of refractory slurry, which adheres to the shell, the particulate size in the slurry, the time to dry, for each coat, and the ultimate volume of the shell.

Removing the sacrificial pattern by melting or burning it out of the shell, leaving a negative air space representative of the original master pattern. This must be very clean, which means this step is usually accompanied by some pressure process to remove the ash traces.

This operation can be simple, but for a thin sectioned casting such as a turbocharger blade, controlled airflow is required to ensure that all of the ash or molten material is removed from the shell.

For highly reactive materials such as molten titanium, at 1870° C., it is critical to the purity of the casting so that any material which can provide free oxygen to the incoming molten titanium is purged from the shell.

Filling the shell with the molten material desired. The metal is cooled and thus solidifies.

For highly reactive materials, such as titanium, this operation must again take place in an inert atmosphere.

Removing the shell, destructively, leaving a metal positive of the facsimile.

Optionally de-burring, heat-treating and/or machining the metal positive.

This basic process dates back thousands of years, with natural beeswax used to make patterns, clay used to make molds, and manually operated bellows for stoking furnaces. Examples of artifacts produced by this process have been found in India's Harappan civilization (2000 BC-2500 BC), Egypt's tombs of Tutankhamun (1333-1324 BC), in Mesopotamia, Mexico, and Benin civilization where the process produced artwork of copper, bronze and gold. Today the process is used for making prototype and production pieces for a wide range of products from automotive, aerospace to dental crowns. In all of these fields, the process follows the same basic process The basic process has changed very little. Beeswax has been replaced by high technology waxes or plastic. The ancient clay has been replaced by sophisticated refractory slurries. Perhaps the greatest advance is that the hand-carving of the pattern has given way to injecting the sacrificial material into a void formed in a complex, retractable tool.

The complex die tools of today are machined from metal using CNC multi-axis equipment. These tools for castings such as turbocharger wheels cost from $20,000 to in excess of $150,000, depending on the complexity of the part. The lead time in the production of these tools is proportional to the cost and can be greater than 12 weeks.

In the manufacturing step, a series of facsimiles (e.g., 2-30) are manufactured, and these facsimiles, or sacrificial patterns, are joined together on a "tree" with a sprue and runners, so that multiple parts are poured at one time. The number of parts on any "tree" is determined by the complexity, shape, and thickness (of the thinnest section) of the part and the solidification (cooling) rate of the molten metal, the relationship between the volume of the part and tree, the direction of the filling, and the volume of metal in the pre-molten slug. Trees for small wheels may have a dozen part facsimiles in them; trees for larger parts may have 4 or 6 facsimiles in them.

These trees are made of wax, or plastic, onto which hand labor is used to glue or affix wax or plastic sacrificial facsimiles of wheels or parts, thus producing a "tree". This practice is very labor intensive, slow, with risk to the surfaces of the sacrificial patterns, with testing and rejecting defective parts adding to the overall manufacturing cost of the individual parts.

Time:

The time required for the process of forming a wax sacrificial patter in a wax tool is as follows:

Step 1: The pattern tool is engaged, wax is injected, the inserts are retracted and the wax pattern is carefully removed—depending on part size, this operation ranges from 90 seconds to 120 seconds. For a typical tree, consisting of 30 patterns, using one tooling die, this time adds up to 60 minutes.

Step 2: The patterns are glued onto runners and sprues to build the tree of parts. This may take as little as 2 minutes.

Step 3: Build the shell by repeatedly dipping tree, then shell, into slurry and drying under controlled conditions: up to 5760 minutes (4 days). This number varies from 2 to 4 days depending on the size of the part.

Step 4: Remove the wax by autoclaving the shell and blowing out the wax, then fire the shell: 20 to 30 minutes.

Step 5: Heat metal to melting point and pour into shell. 15 minutes. This includes pour time, and cool time (6 minutes) but does not include preheat time of 45 minutes as it happens in parallel.

Step 6: Remove shell from solidified metal: average time, 3 minutes. Depending upon the level of automation of the process this time ranges from 2 minutes to 5 minutes.

The total time for the entire process is thus approximately 5871 minutes in 2007.

Quality Aspects:

With die-based tools for producing sacrificial patterns, any wear in the dies, or in the mechanism supporting and controlling the die position, manifests itself as an artifact on the pattern, which will then be replicated on the metal part. Any handling damage to the very thin, fragile, wax or plastic blades becomes replicated in the cast metal part.

Any changes to the tooling must be logged and approved, which consumes resources. A change to a blade surface, at this level, can ultimately cause a change in engine emissions, so the responsibility of the foundry, to their customer, is great. This is actually a rather large cost item.

For the casting of titanium, any free oxygen will combine with the molten titanium to produce alpha-phase titanium impurities in the casting. These alpha-phase inclusions may produce stress raisers which manifest themselves as failure sites particularly if they happen to lodge in a high stress area of the casting. This free oxygen can be picked up from any impurities in any of the processes upstream of the molten metal pouring operation, or even from the shell melting. Unfortunately these alpha-phase impurities cannot be found superficially, by any non-destructive tests, and the existence of these impurities is often only discovered after they have initiated a failure site.

Cost:

The automotive world is very cost conscious, often without the volumes to vindicate and support these high costs. Turbocharger volumes range from millions in the passenger car business to only thousands in the commercial diesel markets. The present method for the production of investment-cast turbine and titanium wheels uses technology which has not changed, but for some automation and upgrade of materials, for 5000 years. The process is very capital intensive on the front end, for the production of sacrificial patterns, time and space intensive in the middle stages and typical on the latter stages.

Other Art.

U.S. Pat. No. 5,147,587 (Harris) teaches selectively sintering a layer of powder followed by deposition of another layer and repeating the process to produce a part comprising a plurality of layers.

U.S. Pat. No. 4,844,144 (Murphy) teaches a method of investment casting utilizing a pattern produced by stereolithography in which a three-dimensional specimen is provided by light cure of ethylenically unsaturated liquid material.

U.S. Pat. No. 7,228,191 (Hoffmeister) teaches how to generate a single wax pattern from an electronic model to produce dental crowns. This teaching, as with patents in this art, is limited to production of single pieces.

There is thus a need for a process by which the manufacture of thousands or tens of thousands of parts can be further automated to reduce labor costs, to reduce incidence of human induced error, to increase efficiency and trueness so that the final product delivers specified performance.

SUMMARY OF THE INVENTION

As discussed above, the process for investment casting of complex shapes has historically had 6 basic steps in it. In accordance with the present invention as discussed below, depending upon the path taken, these discrete steps have been reduced to either 5 steps, or to 2 steps, eliminating steps previously thought to be necessary. In accordance with the invention, instead of having to generate the shape of each sacrificial pattern, the process generates either (A): a male tree containing a plurality of sacrificial patterns, already on their runners, or (B): a female shell, made of a refractory material, forming the outside surfaces of a plurality of sacrificial patterns and runners. This process removes capital expenditure for tooling, and reduces process time by up to 90%, depending upon the size of the part to be cast.

By removing several lengthy, time-dependant steps from the process the part cost and lead time are reduced.

BRIEF DESCRIPTION OF THE DRAWINGS

In the following the invention will be described in greater detail on the basis of figures wherein:

FIGS. 9A and 9B respectively depict a reinforcing structure characterized by struts and a reinforcing structure characterized by a honeycomb pattern.

DETAILED DESCRIPTION OF THE INVENTION

Figure 1:
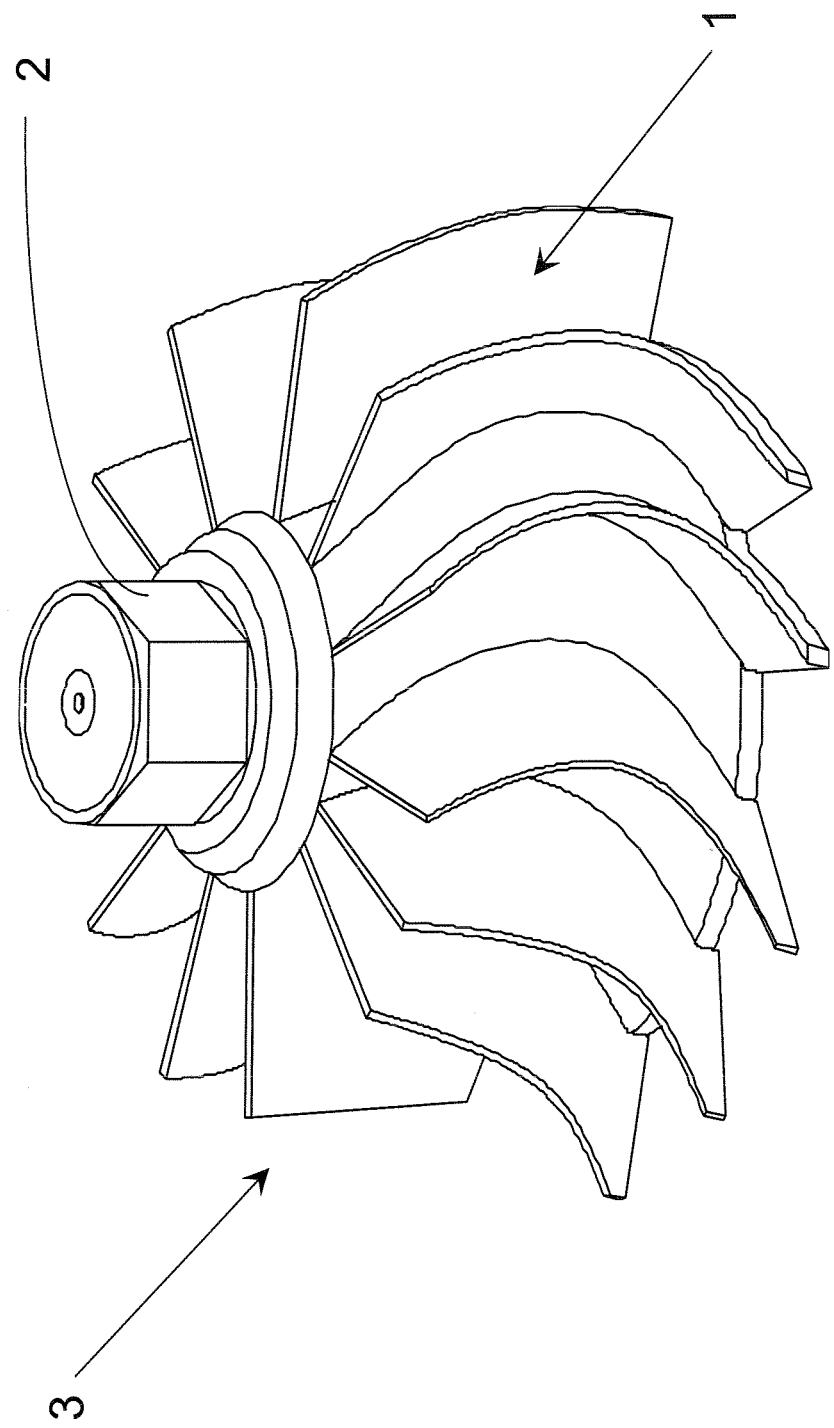
FIG. 1 depicts a typical turbocharger investment cast turbine wheel casting.
Figure 2:
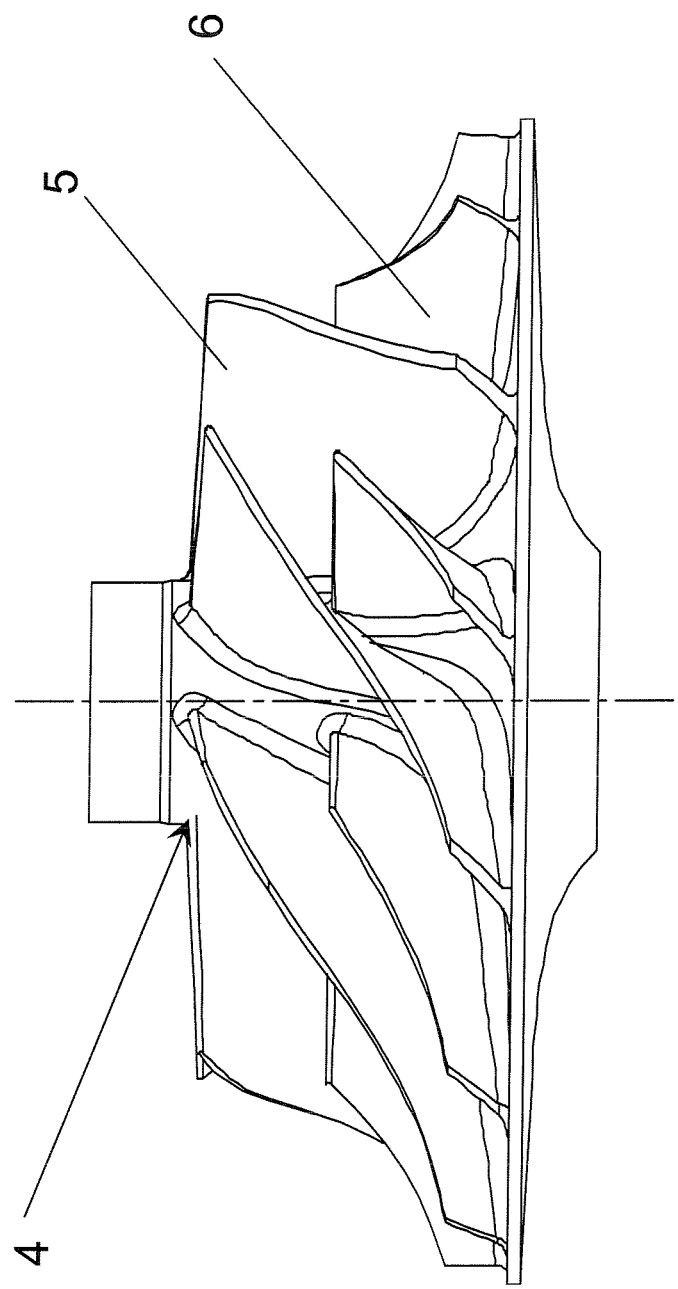
FIG. 2 depicts a typical turbocharger compressor wheel.

Investment casting is used to produce difficult-to-cast parts in a variety of materials. FIG. 1 depicts a typical turbocharger cast Inconel® turbine wheel. FIG. 2 depicts a typical cast titanium compressor wheel. The turbine wheel (3) consists of a hub with a detailed backface and detailed nose (2), incorporating the nut detail, supporting a plurality of blades (1). The features of the nose are formed by the coming together of the set of die inserts, the features of the backface are often formed by a separate disc which is fitted to the sacrificial pattern tooling plate assembly. Thus the accuracy and veracity of the nose features and the concentricity of the backface features are a function of the condition of the tool producing the sacrificial pattern. The compressor wheel hub (4) supports a plurality of full blades (5) and partial or splitter blades (6). In either case the generation of the consumable pattern requires a complex, expensive, finely machined tool.

Figure 3:
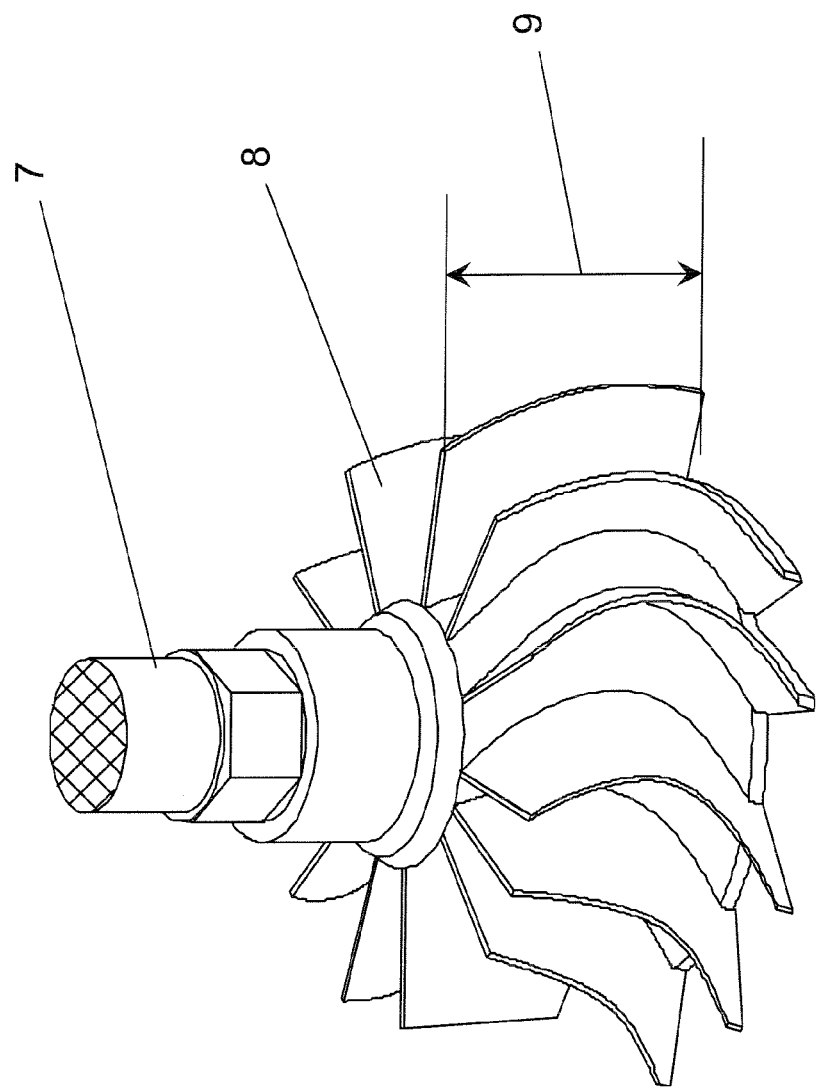
FIG. 3 depicts a male wax or plastic consumable pattern of a turbine wheel with a runner or sprue.

In order to be able to generate a mold cavity which mimics the shape of the part to be cast, the master pattern of the part must first be produced as shown in FIG. 3 which depicts a male consumable pattern of a turbine wheel with a plurality of blades (8), which have the same shape, size and thickness as the blade to be cast, with consideration given for process shrinkage. The blade in the drawing is seen to have a height (9). The part to be cast is attached, in this case molded, to a male sprue, or runner (7), which is required by the casting process to flow molten metal to the cast part.

Figure 4:
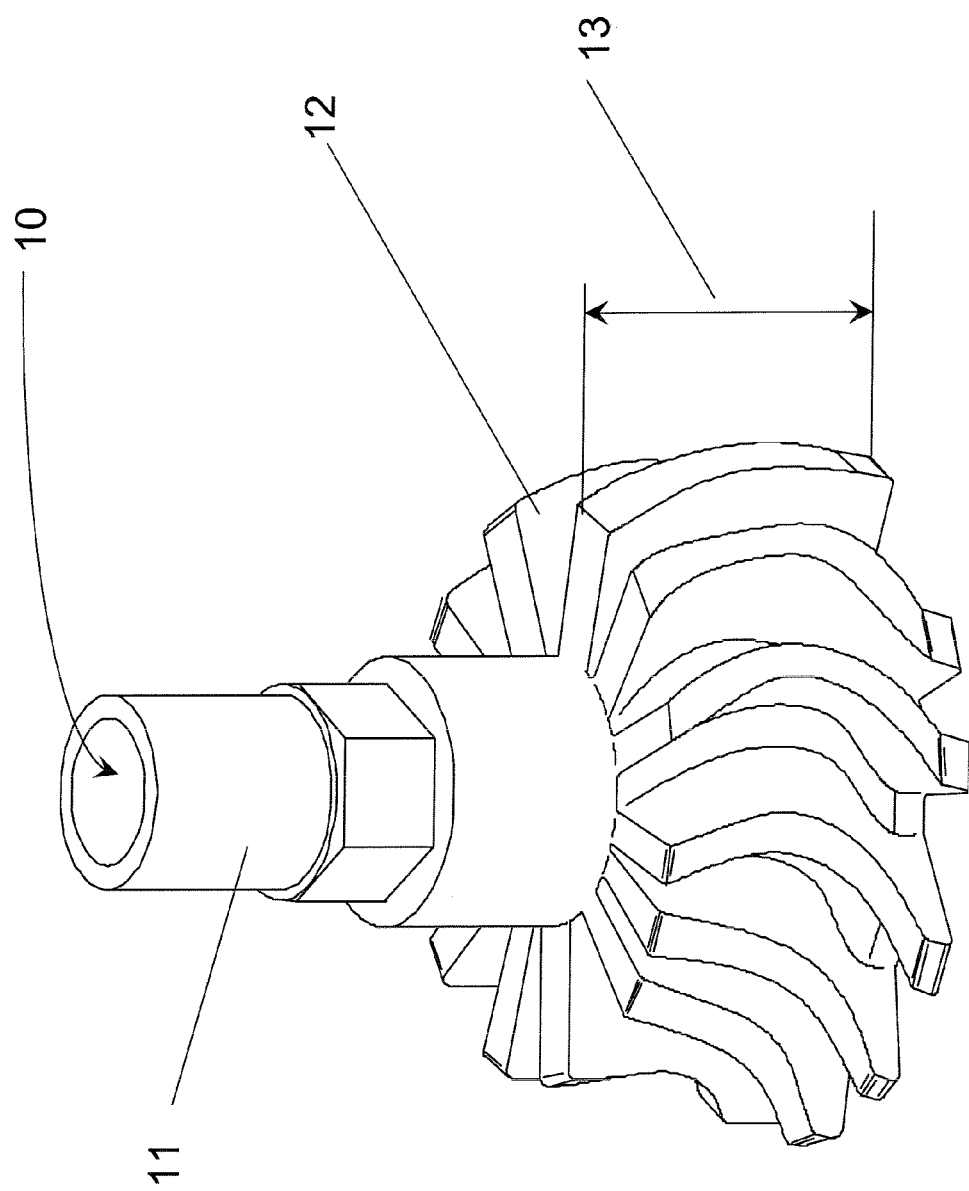
FIG. 4 depicts a female, refractory ceramic, shell with partial tree.

FIG. 4 depicts a shell, which is hollow inside. The inside surface (10) of the shell represents the negative, or female of the shape, size and thickness as the part to be cast, again, with a mold part (11) for casting the sprue or runner, the mold part (11) already molded, or attached to the shell. In this case the blade shell (12) is much thicker and rougher, and longer (13), than the male blade (8), as it represents the blade with a refractory ceramic shell built up over the blade such that the inside surfaces mimic the blade and the outside of the shell is simply in existence to support the inner surfaces. Once the shell is filled with molten material and it solidifies, the shell is broken away to reveal a metal version of what is seen in FIG. 3, albeit corrected by the shrinkage factors so that this piece is the correct size, shape and thickness.

Figure 5:
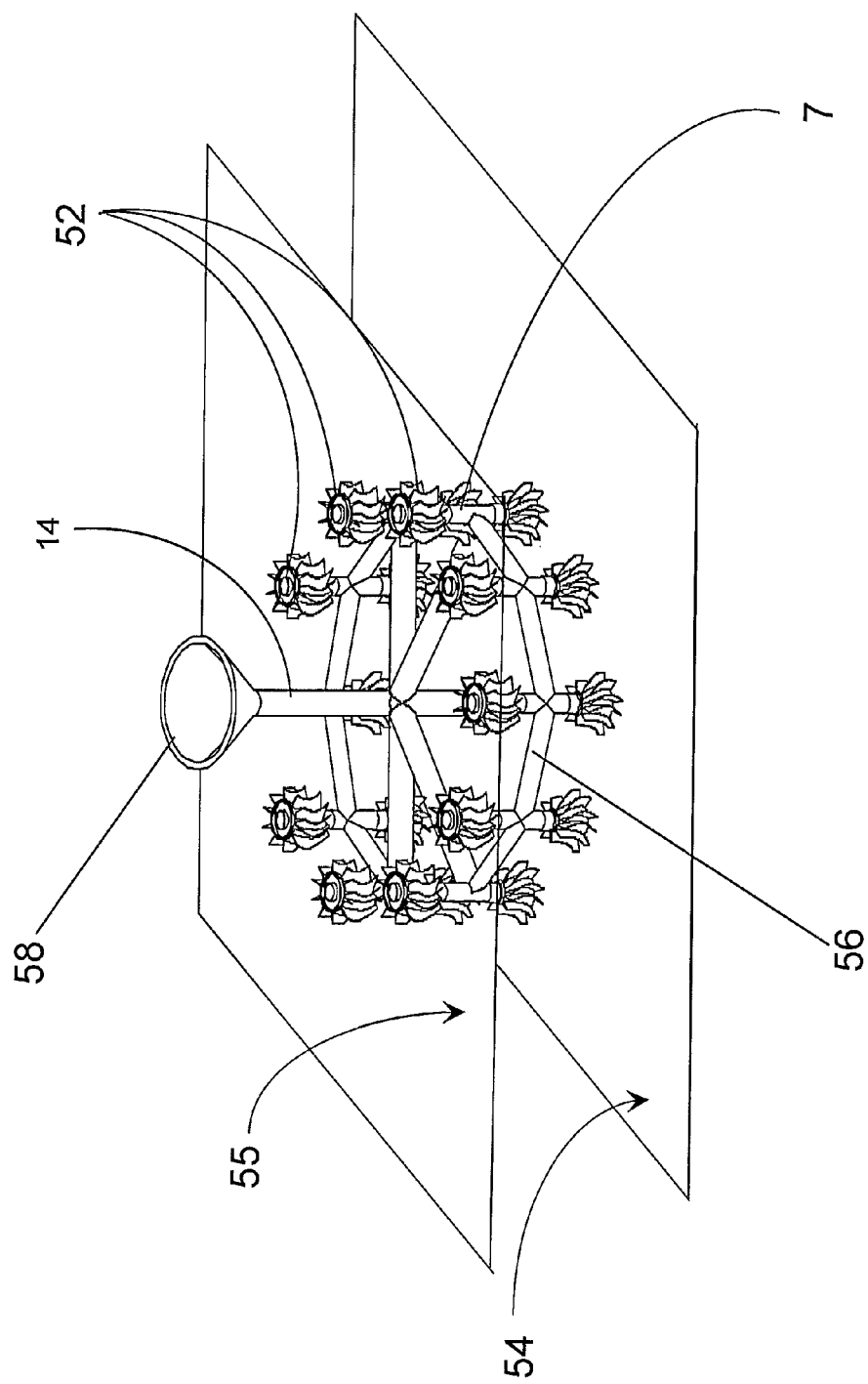
FIG. 5 depicts a "tree" of sacrificial patterns.

A first embodiment of the invention, embodiment (A), will be explained by reference to FIG. 5, illustrating the methodology of a typical well-known rapid prototyping procedure used in a production environment, but in this case, to create a complete tree of a sacrificial material consisting of multiple "positive" male patterns (52), representing the shape, size and thickness of the parts to be cast. The procedures by which the solid forms are produced are variously known as, e.g., rapid prototyping (RP), three-dimensional printing (3-D Printing), selective laser sintering (SLS), solid ground curing (SGC), fused deposition modeling (FDM), ink jet printing, solid free-form fabrication ("SFF"), stereo-lithography (or stereolithography apparatus, SLA), and Cubital's Solider system. The fabrication techniques usually depend on the use of computers to generate cross-sectional patterns representing the layers of the object being formed, and generally require the associated use of a computer and computer-aided design and manufacture (CAD/CAM) software. In general, these techniques rely on the provision of a 3-D digital representation of the object to be formed. The 3-D digital representation of the object is reduced or "sliced" to a series of 2-D cross-sectional layers which can be overlaid to describe the object as a whole. The apparatus for carrying out the fabrication of the object then utilizes the cross-sectional representations of the object for building the layers of the object by, for example, determining the path of the laser beam in an SLA or the configuration of the mask to be used to selectively expose UV light to photosensitive liquids.

The properties required of a good pattern wax are described by J. H. W. Booth, Foundry Trade Journal, December 1962 and by D. Mills, B.I.C.T.A. 11th Annual Conference, May 1971. These include melting point, ash content, shrinkage/expansion characteristics, strength, plasticity, viscosity, thermal stability, oxidative stability and surface appearance. Other properties such as resistance to or solubility in acids and bases may be important in certain instances. Suitable sacrificial materials are disclosed in U.S. Pat. No. 3,854,962 (composition for use in the manufacture of precision investment casting molds including combinations of various types of waxes, usually combined with resins such as wood rosin or synthetic resins and a combustible polyhydric alcohol having a melting point above the melting point of the wax to act as a filler for the pattern composition); GB 1,378,526A (investment casting waxes with addition of carbon microspheres to reduce contraction on cooling); U.S. Pat. No. 3,880,790 (investment casting wax composition containing substituted polystyrenes—esp. vinyl toluene-alpha-methyl styrene copolymer waxes. Pattern waxes in common use may contain natural or synthetic resins, natural or synthetic waxes and a variety of other materials such as stearic acid. Resins that may be used include rosin, rosin esters, gum damar, modified phenolics, alkyds of low molecular weight, terpene resins, petroleum resins, chlorinated naphthalene, chlorinated biphenyl, etc. Waxes that may be used include beeswax, vegetable waxes such as carnauba and candelilla, mineral waxes such as paraffin wax, microcrystalline wax and montan, and synthetic waxes such as amide waxes, ester waxes, Fisher-Tropsch waxes, castor oil derived waxes, etc.); U.S. Pat. No. 3,717,485 (pattern wax compositions containing aromatic polycarboxylic acid imide as filler for use in investment casting by the Lost Wax Process. The pattern wax composition materials contain base waxes such as petroleum waxes, natural vegetable or mineral waxes, synthetic waxes and various resinous materials derived from the refining of petroleum and wood rosin, and mixtures of the above and solid filler particles such as phthalic acid); U.S. Pat. No. 3,704,145 (investment casting wax composition consisting essentially of refined petroleum wax, solid chlorinated biphenyl, ester type montan waxes, Fischer-Tropsch wax, and a metal soap); U.S. Pat. No. 3,655,414 (pattern materials for use in investment casting by the Lost Wax process consisting essentially of waxes such as petroleum waxes, natural vegetable or mineral waxes, synthetic waxes and various resinous materials derived from the refining of petroleum and wood resin, and mixtures of the above. The base wax generally has a melting point of between about 120° to 180° F. The base wax composition is improved by the inclusion of up to about 75 percent by weight, preferably a minor amount, of solid filler particles of a phthalic acid. Isophthalic acid is the preferred filler); and U.S. Pat. No. 5,975,188 (casting by investment casting of a metal or alloy, especially titanium and its alloys, in a ceramic investment shell mold. The ceramic facecoat slurry typically is applied as one or more coatings to a fugitive pattern, such as a wax pattern, having a configuration corresponding to that of the casting to be made pursuant to the well known lost wax process. For example, a pattern made of wax, plastic, or other suitable removable material having the desired configuration is formed by conventional wax or plastic die injection techniques and then is dipped in the aforementioned ceramic mold facecoat slurry. The slurry also may be applied to the pattern by flow coating, spraying or pouring. In the event that the mold facecoat will comprise two dipcoats or layers, the pattern may again be dipped in the ceramic facecoat slurry and partially dried and/or cured).

Referring now to FIG. 5, the initial or bottom plane (54) is the first plane upon which fine particles of fusible material is deposited. Then, layer, by layer, the fusible material is spread on the platen, and selectively fused to the already fused material deposited on the prior layer, until a full tree "positive" sacrificial pattern is built. When plane (55) has been offered and no material is deposited onto this level, the procedure advances to the next step wherein unfused particles are separated from the fused form. The sacrificial patterns (52) are linked to the vertical sprues (7) and the connecting runners (56). The runners, sprues and patterns are printed with the male patterns. The filling funnel (58) may be printed with the patterns, sprues and runners, or it may be added later.

Figure 6:
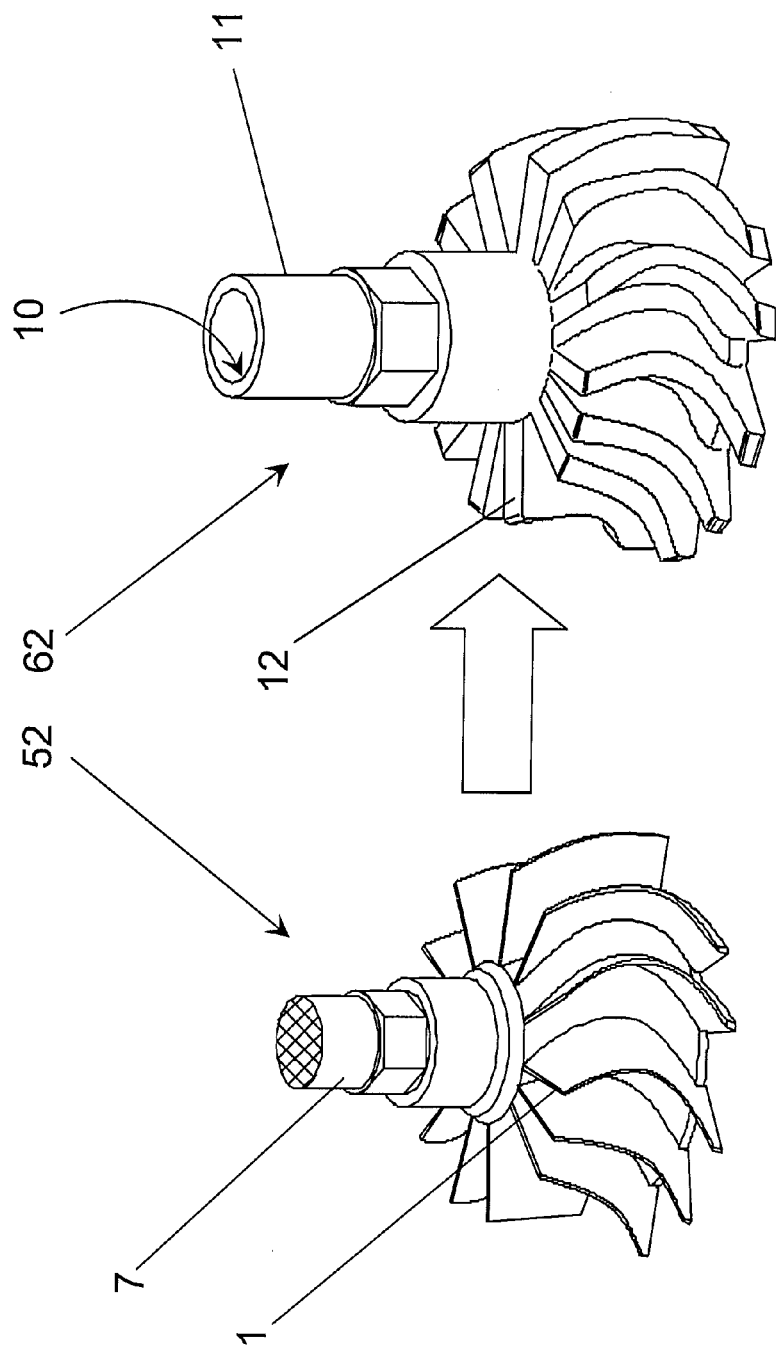
FIGS. 6A, B depicts the change in shape from pattern to shell.

FIG. 6A illustrates only one turbine wheel of the "tree" of FIG. 5, showing in greater detail the sacrificial pattern (52), of FIG. 6A which is repeatedly dipped in a refractory slurry until the thin blade sections (8) become thick ceramic shells (12) as shown in FIG. 6B. During this process, the sprue (7) also acquires a ceramic shell with an outer surface (11) as well as an inner surface (10) surrounding the sacrificial core which will be removed to form the channel through which the molten material will travel to the wheel casting. This process produces the part depicted in FIG. 6B. This last operation, translating the image of FIG. A to the image of FIG. 6B is typical of the investment casting process. The end result of the above process becomes the end result of the second embodiment of the invention, which is generated in a different and innovative manner.

Figure 7:
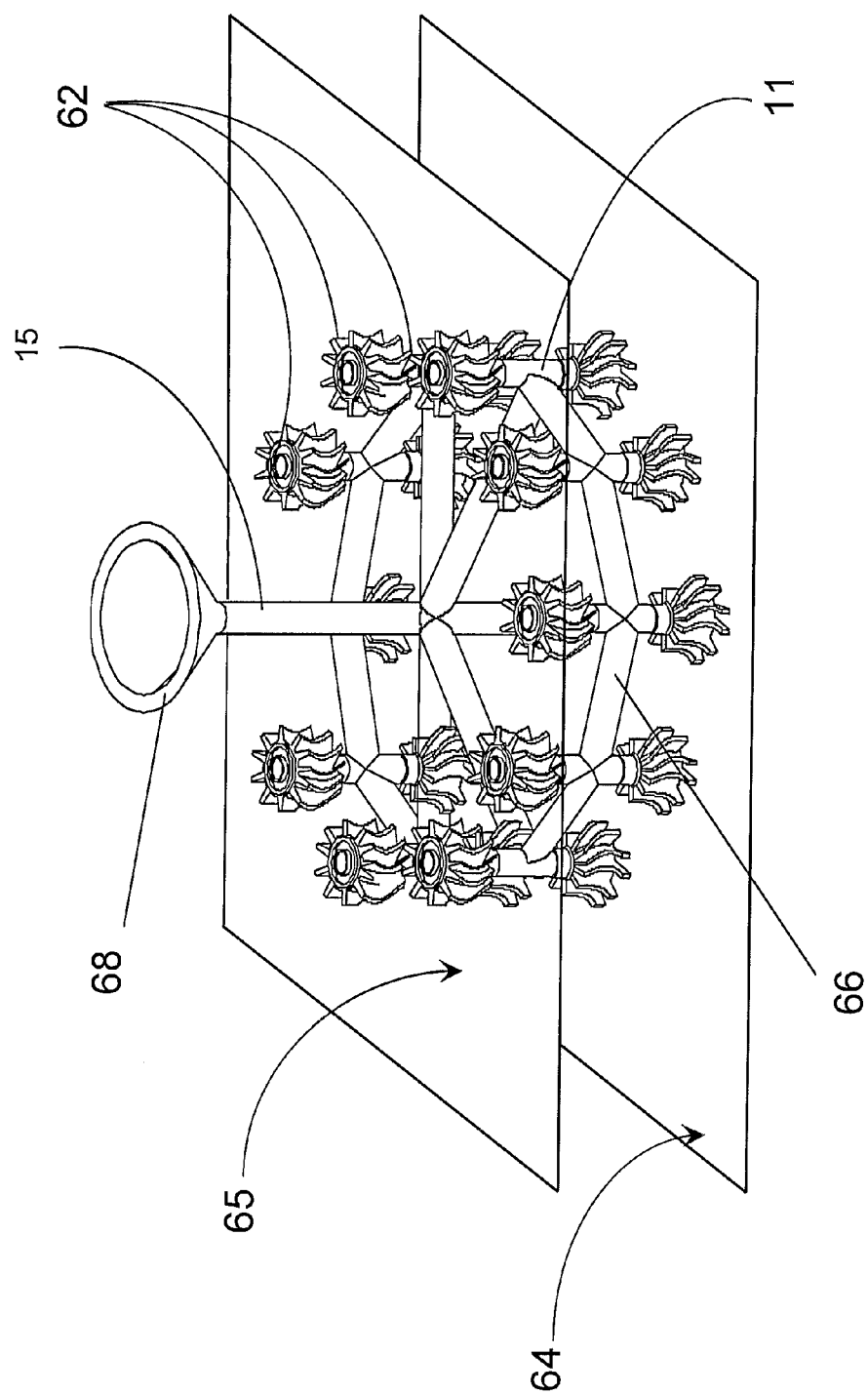
FIG. 7 depicts a "tree" of refractory ceramic shells joined by runners and/or sprues.

A second embodiment of the invention, embodiment (B), will be explained by reference to FIG. 7. The methodology of a typical rapid prototyping procedure is again used in a production procedure, but this time, instead of fusing particles in order to create a male "positive" pattern, the method creates a "negative" female mold about a complete tree defining multiple shells (62) of the parts to be cast. In the second embodiment of the invention, the initial plane (64) is the first plane upon which material is deposited. Then, layer, by layer, the deposition material is placed on the platen, and fused to the material deposited on the prior layer, until a full mold is built defining within it a tree. When plane (65) has been offered and no material is deposed onto this level, the process is complete. The mold shells (62) are linked to the mold of the vertical sprue (11) and the mold of the connecting runners (66). Unsolidified particles exterior to the mold fall away as the mold is removed from the rapid prototyping "box". Interior non-fused particles are then removed by shaking or blowing, or are melted or burned out, producing a mold ready for casting.

Interior particles can also be blown away intermittently during mold forming. Alternatively, the particles can be of a composition that changes from soluble to insoluble when fusing or cross-linking, such that interior non-fused particles can be dissolved following mold forming. Further yet, the mold can be formed in, e.g., stages of 20 layers, each stage can be rendered free of unfused particles, and stages can be stacked to form the final mold. The desired metal is melted and molten material enters the runners, sprues and patterns through the funnel (68).

Suitable mold forming particle materials and rapid prototyping processes are disclosed for example in U.S. Pat. No. 5,382,308; U.S. Pat. No. 6,335,052; U.S. Pat. No. 6,350,495; U.S. Pat. No. 5,902,441; U.S. Pat. No. 5,940,674; EP 0731743 B1; and WO/2001/029103.

Figure 8:
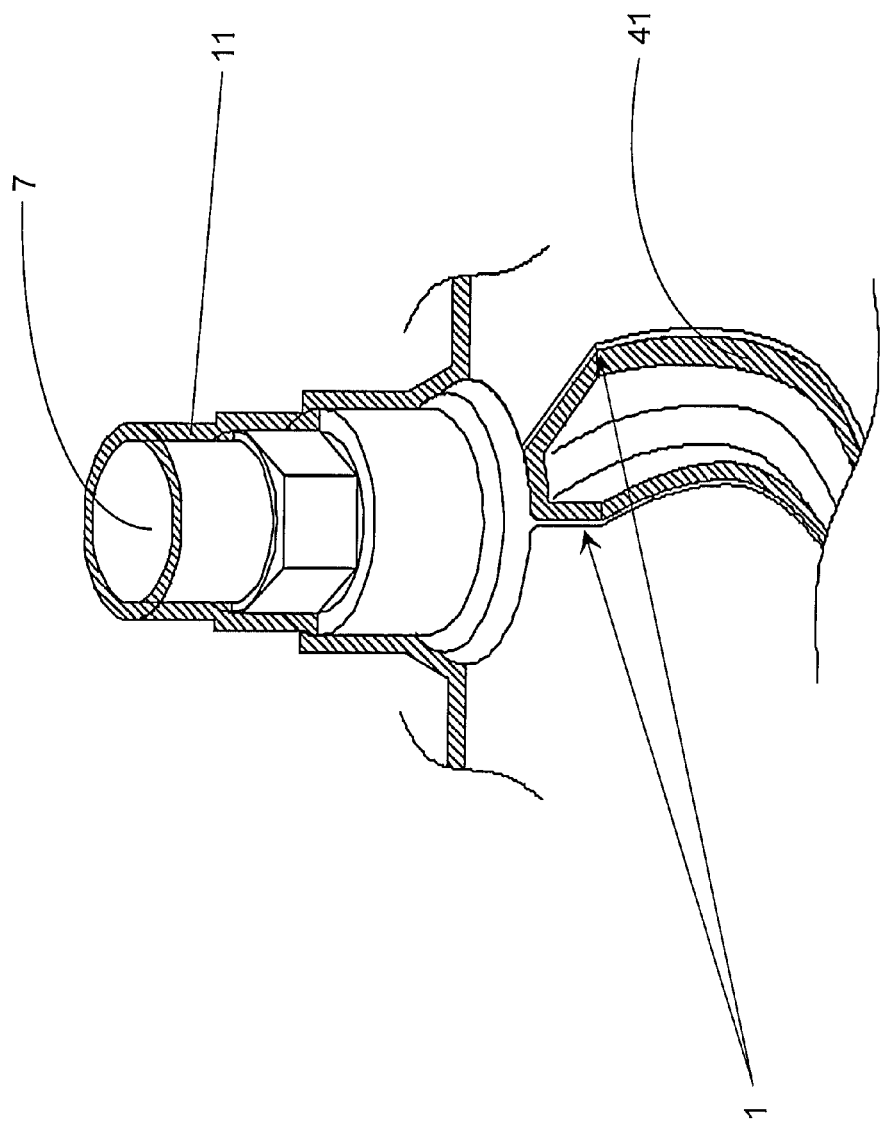
FIG. 8 depicts a variation of the second embodiment of the invention.

In a variation of the second embodiment of the invention, seen in FIG. 9A, instead of a thick ceramic shell (41), as seen in FIG. 8, the shell (42) in the zone of the blades (1) is much thinner and is supported by a less dense structure. In the exemplary first variation of the second embodiment of the invention, the thinner ceramic shell is supported by struts (43) which are generated during the deposition stage of the process. The result is that the shell has less mass, which means that less material is used in generating the shell, the thermal inertia of the shell is reduced and the shrinkage deformation generated in the historic process (With the thick shell (41) around the critical shapes and areas of the part being cast) is minimized. The shell is constrained in a much more defined manner as the supporting structure can be placed to constrain the shell in the planes desired. The placement and orientation of the support structure can be ascertained by modeling rather than experience.

In the above variation of the second embodiment of the invention, the support structure is shown as struts between shell walls. As shown in FIG. 9B, it could be a honeycomb-like structure 44, it could be any shape shown as desirable by finite element analysis or a computer driven modeling program.

Advances in the state of the art can be found in both forms of the invention:

In case (A), the first embodiment of the invention: the present invention completely eliminates the capital cost of tooling, which can range from $20,000 to $150,000. In case (A), the patterns are made using technology which was formerly used only for rapid prototyping and these are merged with the historical process, in place of tooling. This reduces what was a 6 basic step process down to 5 basic steps.

In case (B), the second embodiment of the invention: the tooling, positive patterns and dipping and drying process are totally removed and replaced by a process in which the shell is produced as the first step in the foundry process. This takes what was a 6 basic step process down to 3 basic steps. The remaining 3 steps are eliminated.

The short term gains will be lowered capital costs, the longer terms gains will be lower capital tooling cost and no drying rooms being required.

Additional gains are realized in:

Taking at least 4 days out of the 5 formerly required for drying. Because the layers are printed rapidly, and are, by design, thin steps, they dry quickly, with resultant minimal distortion.

No hard tooling to manage. Hard tooling simply no longer exists. Each shell is produced, raw, from digital data, so the quality system required simply reverts to design control.

No hard tooling to wear out. Each tree made is made "fresh" directly from digital data.

Parts with complex geometry, which were not possible to manufacture using the traditional investment casting process, such as compressor wheels and turbine wheels with complex blade geometry (twist, undercut, backsweep, warp, etc.) can be made with the same effort as those normally made using the investment casting process. Negative rakes, or "catches", which would have prevented retraction of the insert in the usual process, present no hindrance to this new process as there are no inserts which require retraction. Cast titanium compressor wheels with a high degree of wrap and backsweep, which were limited to those which were pullable as disclosed for example in U.S. Pat. No. 6,663,347 Roby, Decker need no longer be pullable, so that they can be cost-effectively cast using the investment process. This is true for any part using this invention. Changeover from part to part is seamless as it will be simply a matter of loading software. From global perspective this means that not only can the "printing" device make turbine wheels of different sizes and designs, it could make turbine wheel shells one day and cast titanium compressor wheels the next, all tasks performed "lights out", 24/7.

No wax machines to load the wax into the tools. In case "B", no wax, or the machines in which the wax is injected into the voids, are a requirement. This reduces capital costs and space requirements. Similarly with plastic sacrificial patterns, neither the devices to produce them, nor the material in which they are made, are required. In case "A" there will still be a requirement for some material from which to build the sacrificial male trees.

No hand labor to build trees from patterns and flow runners. Since, in case "A", the entire tree will be produced lights-out, this will reduce head count. In case "B" this step simply does not exist.

There will be less chance of damage to components of the wax trees as the wax handling requirement is either diminished or eradicated.

Since the mass, shape and volume of the shell are critical to the drying and shrinkage elements of the process, these parts of the shell can be modified so that the design of the areas is related to the function of each area. For example the shell must be capable of handling molten material. The backup to the shell can be made in a honeycomb pattern, rather than solid. This provides sufficient support to the shell but using less material and with the material placed where function requires for it to be placed. This will assist in both drying and shrinkage, at a reduced cost as there will be less material used.

Approximately 65% of the cost of an investment cast turbocharger wheel is in the total shell manufacturing process. By taking the shell building segment of the process from 5871 minutes to 499 minutes, the cost Of the wheel is reduced by 43.5%. That is the 65% shell process component of the part cost becomes only 5.5% of the part cost. The total time for the entire process is 5871 minutes in 2007. For case A, where the process prints the male consumable patterns as a tree, the process time using this invention rises by 418 minutes, an increase of 7.08%, which is offset by no tooling to pay for or manage.

Although using case (A) increases the cost by 7.08%, it makes it possible to manufacture a non-pullable wheel, or part, using the investment process, with the added incentive of no tooling cost.

For case (B), where the process prints the female refractory shells as a tree, the process time is reduced by 5,372 minutes (89.5 hours), a decrease of 91.5%. This produces a massive reduction in cost, for a turbocharger wheel casting, normally costing $50, the casting cost goes to around $22, a savings in the region of 56%. The material cost stays the same and the shell process cost goes from $32.50 to $4.25.

For either process it should be noted that in the case of a turbocharger with a cast titanium compressor wheel, and a standard turbine wheel, the cost savings will double.

There will be the capital cost of the printing machine(s), but they run "lights out" so labor costs are greatly reduced and the automated assets are utilized to the maximum per day. Since the asset can print any number of parts, the total asset cost of all the machines will be greatly reduced.

Parts can be the same or different.

Parts are preferably arranged for uniform, even cooling of the mold.

The following provides one example of cost savings on an industrial scale:

| Step | Process | Time |
|---|---|---|
| 2007 | | |
| Step 1 | Make wax pattern | 2 |
| Step 1A | Make 30 wax patterns | 60 |
| Step 2 | Build tree | 2 |
| Step 3 | Build shell | 5760 |
| Step 4 | Remove wax | 30 |
| Step 5 | Pour metal | 15 |
| Step 6 | Remove shell | 4 |
| | Total Time (Minutes) | 5871 |
| Case A: | | |
| Step 1A | Make tree | 480 |
| Step 2 | | 0 |
| Step 3 | Build shell | 5760 |
| Step 4 | Remove wax | 30 |
| Step 5 | Pour metal | 15 |
| Step 6 | Remove shell | 4 |
| | Total Time (Minutes) | 6289 |
| Case B: | | |
| Step 3 | Build shell of tree | 480 |
| Step 5 | Pour metal | 15 |
| Step 6 | Remove shell | 4 |
| | Total Time (Minutes) | 499 |

| Differences | Time | Change |
|---|---|---|
| 2007 | 5871 | |
| Case B | 499 | |
| | 5372 | 91.5% |
| 2007 | 5871 | |
| Case A | 6289 | |
| | −418 | −7.1% |

| Process minutes | % cost in Shell | Wheel cost | Shell cost | Matl |
|---|---|---|---|---|
| 5871 | 65.00% | $50.00 | $32.50 | $17.50 |
| 499 | 5.52% | $21.75 | $4.25 | $17.50 |
| | | 56.50% | 86.92% | 0.00% |

Now that the invention has been described,

I claim:

1. A method for manufacturing two or more cast parts, comprising:
   (i) using a rapid prototyping process to print a three-dimensional tree of a sacrificial material, the tree comprising runners and/or sprues as well as two or more individual male patterns of the parts to be cast, the runners and/or sprues as well as the two or more individual male patterns being printed together as a single structure, wherein the individual male patterns are joined by the runners and/or sprues to form the tree of sacrificial material,
   (ii) forming a mold around the tree of sacrificial material, wherein the finished mold comprises a solid shell defining the negative pattern of the tree, and a reinforcing structure reinforcing said shell, the reinforcing structure defined by at least 50% voids,
   (iii) removing the sacrificial material from the mold,
   (iv) casting metal into the mold,
   (v) separating the mold from the casting, and
   (vi) separating the cast parts.

2. The method as in claim 1, wherein said parts are a turbocharger turbine wheel or compressor wheel.

3. The method as in claim 1, wherein said metal is an alloy of titanium or aluminum.

4. The method as in claim 1, wherein said rapid prototyping comprises:
   (i-a) generating a three dimensional digital representation of the tree in a computer;
   (i-b) generating digital two-dimensional cross-sectional patterns representing layers of the tree to be formed;
   (i-c) applying a layer of particles, via a dispensing device, upon a substrate;
   (i-d) joining particles in the layer corresponding to a cross-sectional pattern of the tree to be formed to form a solidified cross-sectional pattern; and
   (i-e) repeating steps (i-c) and (i-d), wherein the solidified cross-sectional pattern of each new layer fuses with the adjacent solidified cross-sectional pattern of the underlying layer, until the joined layers combine to form the tree.

5. The method as in claim 1, wherein said reinforcing structure is characterized by a honeycomb pattern.

6. The method as in claim 1, wherein forming the mold around the tree of sacrificial material includes repeatedly dipping the tree of sacrificial material in a mold material, wherein the mold directly contacts at least the two or more individual male patterns of the parts to be cast.

7. A method for manufacturing two or more cast parts, comprising:
   (i) using a rapid prototyping process to print a three-dimensional mold with a void defining the negative pattern of a tree comprising two or more parts connected via runners and/or sprues, the mold defining the outer surfaces of the two or more parts, the mold being free of internal sacrificial patterns, the mold having a wall thickness and density that varies so that the mold has at least one zone in which the wall is thin and less dense relative to other wall zones, and the at least one zone is formed having a reinforcing structure,
   (ii) casting metal into the mold, wherein sacrificial patterns are not provided within the mold during casting,
   (iii) separating the mold from the casting, and
   (iv) separating the cast parts.

8. The method as in claim 7, wherein said parts are a turbocharger turbine wheel or compressor wheel.

9. The method as in claim 7, wherein said metal is an alloy of titanium or aluminum.

10. The method as in claim 7, wherein said rapid prototyping comprises:
    (i-a) generating a three dimensional digital representation of the mold to be formed in a computer;

(i-b) generating digital two-dimensional cross-sectional patterns representing layers of the mold to be formed;
(i-c) applying a layer of particles, via a dispensing device, upon a substrate;
(i-d) joining particles in the layer corresponding to a cross-sectional pattern of the mold to be formed to form a solidified cross-sectional pattern; and
(i-e) repeating steps (i-c) and (i-d), wherein the solidified cross-sectional pattern of each new layer fuses with the adjacent solidified cross-sectional pattern of the underlying layer, until the joined layers combine to form the tree.

11. The method as in claim 7, wherein the reinforcing structure comprises struts generated during printing of the three-dimensional mold, the struts extending between mold walls.

12. The method as in claim 7, wherein the reinforcing structure comprises a honeycomb pattern generated during printing of the three-dimensional mold.

13. A method for manufacturing two or more cast titanium turbocharger turbine wheels or titanium compressor wheels, comprising:
(a) using a rapid prototyping process to print a three-dimensional tree of a sacrificial material, the rapid prototyping process comprising (i) generating a three dimensional digital representation of the tree in a computer; (ii) generating digital two-dimensional cross-sectional patterns representing layers of the tree to be formed; (iii) applying a layer of particles, via a dispensing device, upon a substrate; (iv) joining particles in the layer corresponding to a cross-sectional pattern of the tree to be formed to form a solidified cross-sectional pattern; and (v) repeating steps (iii) and (iv), wherein the solidified cross-sectional pattern of each new layer fuses with the adjacent solidified cross-sectional pattern of the underlying layer, until the joined layers combine to form the tree,
(b) the tree comprising runners and/or sprues as well as two or more individual male patterns of the parts to be cast, wherein the individual male patterns are joined by the runners and/or sprues to form the tree of sacrificial material, the runners and/or sprues as well as the two or more individual male patterns being printed together as a single structure,
(c) forming a mold around the tree of sacrificial material, wherein the finished mold comprises a solid shell defining the negative pattern of the tree, and a reinforcing structure reinforcing said shell, the reinforcing structure defined by at least 50% voids,
(d) removing the sacrificial material from the mold,
(e) casting metal into the mold,
(f) separating the mold from the casting, and
(g) separating the cast parts.

14. The method as in claim 13, wherein forming the mold around the tree of sacrificial material includes repeatedly dipping the tree of sacrificial material in a mold material, wherein the mold directly contacts at least the two or more individual male patterns of the parts to be cast.

* * * * *